(12) United States Patent
Drummond et al.

(10) Patent No.: US 7,756,780 B2
(45) Date of Patent: Jul. 13, 2010

(54) METHOD AND SYSTEM FOR BALANCE TRANSFER OPERATIONS

(75) Inventors: Stephen Todd Drummond, Atlanta, GA (US); Mark R. Pendleton, Atlanta, GA (US)

(73) Assignee: Compucredit Intellectual Property Holdings Corp. II, Las Vegas, NV (US)

( * ) Notice: Subject to any disclaimer, the term of this patent is extended or adjusted under 35 U.S.C. 154(b) by 525 days.

(21) Appl. No.: 11/355,425

(22) Filed: Feb. 16, 2006

(65) Prior Publication Data

US 2007/0192244 A1 Aug. 16, 2007

(51) Int. Cl.
G06Q 40/00 (2006.01)

(52) U.S. Cl. .......................... 705/38; 705/39
(58) Field of Classification Search ............... 705/39
See application file for complete search history.

(56) References Cited

U.S. PATENT DOCUMENTS

| | | | | |
|---|---|---|---|---|
| 5,949,044 | A * | 9/1999 | Walker et al. ............... | 235/379 |
| 6,325,424 | B1 * | 12/2001 | Metcalfe et al. ............. | 285/305 |
| 7,191,150 | B1 * | 3/2007 | Shao et al. .................. | 705/38 |
| 2002/0123946 | A1 * | 9/2002 | Haworth et al. ............. | 705/35 |
| 2002/0123962 | A1 * | 9/2002 | Bryman et al. .............. | 705/39 |
| 2004/0073504 | A1 * | 4/2004 | Bryman et al. .............. | 705/36 |
| 2005/0097033 | A1 * | 5/2005 | Pretell et al. ................. | 705/38 |
| 2005/0171901 | A1 * | 8/2005 | Rosenblatt et al. ........... | 705/39 |
| 2006/0080236 | A1 * | 4/2006 | Welker et al. ................ | 705/40 |

OTHER PUBLICATIONS

Financial Services Firms Need More Customization ( Discussion of the need for more customized products from financial services companies due to higher demand from consumers ) Web Finance , p. N/A Jun. 25, 2001.*
A Facile Approach to Bankruptcy Issue; [Home Edition] Los Angeles Times. Los Angeles, Calif.: Jun. 25, 2000. p. 2.*
Watching for signs of bankruptcy Ted Cornwell. National Mortgage News. New York: Mar. 3, 1997. vol. 21, Iss. 22; p. 32, 1 pgs.*
Financial Services Firms need more customization, Wb Finance Jun. 25, 2001.*
A facile approach to bankruptcy issue, Los Angeles Times, Jun. 25, 2000.*
Watching for signs of bankruptcy, Ted Cornwell, National Mortgage News, Mar. 3, 1997.*

* cited by examiner

*Primary Examiner*—Hani Kazimi
*Assistant Examiner*—William E Rankins
(74) *Attorney, Agent, or Firm*—Philip H. Burrus, IV

(57) ABSTRACT

A system and method for extending a balance reduction offer to a set of borrowers selected from a pool is provided. A lender, for instance a financial institution issuing credit cards to a pool of borrowers, selects a subset of borrowers based upon a criterion. The balance reduction offer includes a financial incentive to encourage the borrower to accept the offer. When the borrower accepts the offer, the lender credits the account for a payment received. In one embodiment, an issuer of credit cards may employ the invention to facilitate selected borrowers transferring outstanding balances to another credit card. In such an embodiment, the borrower may complete the transaction with the assistance of a cash wire transfer company.

20 Claims, 4 Drawing Sheets

METHOD AND SYSTEM FOR BALANCE TRANSFER OPERATIONS

BACKGROUND

1. Technical Field

This invention relates generally to a system and method for transferring credit card balances from one lender to another, and more specifically to a system and method for offering a financial incentive for a particular client to transfer an outstanding balance from a first lender offering the financial incentive to a second lender, thereby reducing a total amount due by a pool of borrowers to a lender.

2. Background Art

Pareto's Principal stands for the proposition that in any business, there are "the vital few and the trivial many." First established by Italian economist Vilfredo Pareto in 1906 when he postulated that eighty percent of the wealth was owned by twenty percent of the populace, the theory known as the "80/20 rule" is still in use today. Dr. Joseph Juran refined the principle to its present day form in the 1930's, hypothesizing that twenty percent of something is responsible for eighty percent of the results. In business terms, twenty percent of the customers are, theoretically, responsible for eighty percent of the profits.

A company can improve its profitability if it can refine its customer base to eliminate the trivial many while retaining the vital few. While this is an admirable goal in terms of profit recognition and the bottom line, it is often quite difficult in practice. For instance, financial service companies, like lenders offering credit cards to customers for example, generally have a broad customer base. Their customers run the gamut from people who obtain credit cards only for emergencies and never use them, to people who carry balances for long periods of time. The former costs the company money, as monthly statements must be sent and accounts must be maintained, despite a lack of any fee income. The latter is more profitable, as the company makes money not only when the card is used but through financing as well. By far the most unprofitable customers, however, are the ones who run up high balances and then fail to make any payments. The company has not only lent the customer money, but also potentially faces losing that money due to a defaulting borrower.

From a purely profit-based perspective, it would be advantageous if a company could encourage these customers to pay their balances and then to patronize other financial service companies. The company not only recovers at least a portion of the outstanding debt, but is able to better serve customers who pay in accordance with their terms and conditions, as resources formerly dedicated to the unprofitable customers may now be redeployed to serve the profitable ones.

The problem is that once a customer obtains a credit card, it is difficult for the card issuer to close the account. Occasionally a competitor may offer a better interest rate, which will cause a customer to "switch," but aside from the customer electing to change lenders, there is little a card issuing company can do.

There is thus a need for a system and method for a company, like a financial services company who issues credit cards for example, to encourage unprofitable customers to switch their patronage to other credit providers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
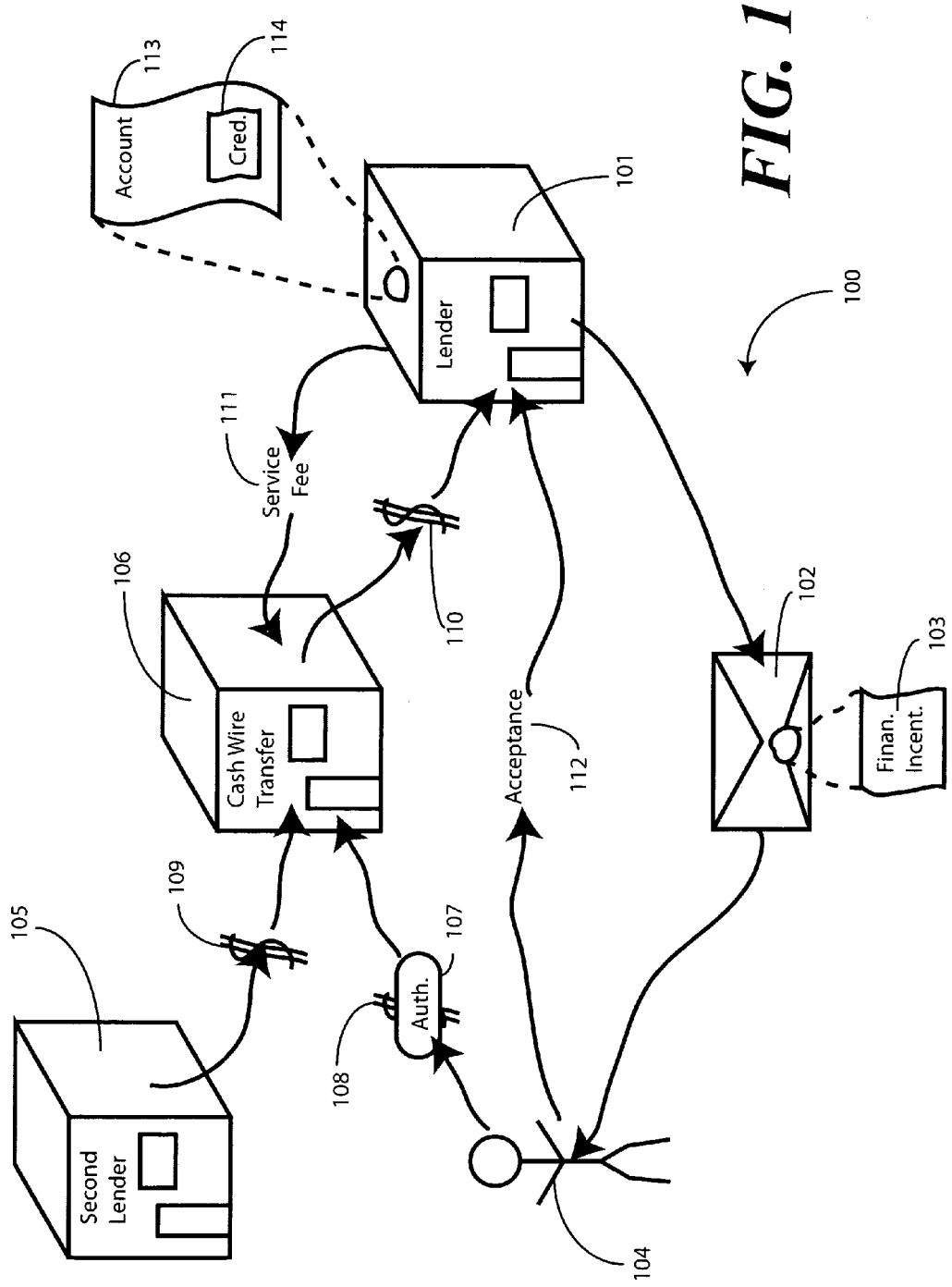
FIG. 1 illustrates an environment and method in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a method of reducing outstanding balances by encouraging less profitable customers to transfer balances to other accounts. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of effecting a balance reduction offer to a subset of customers as described herein. As such, these functions may be interpreted as steps of a method to perform a method suited to allow a lender a mechanism to reduce a total amount due by a pool of borrowers. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

An embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

The present invention includes a system and method for a company, like a financial services company or lender who offers credit cards to customers, to provide a financial incentive for less profitable customers to close existing accounts and to take their business to other companies where the customer's behavior and company business model are a better match. Using a credit card account as an example, in one embodiment, a less profitable customer in good standing may be sent an offer to transfer an existing balance on an outstanding card to another card with another lender. For instance, the offer may notify the customer that they have received an offer for a cost free balance transfer to another card, perhaps with a lower interest rate. The offer may be in affiliation with a bank or cash wire transfer company, such that the customer may contact the bank or cash wire transfer company to initiate the balance transfer. The bank or cash wire transfer company may then pay the lender extending the offer, drawing the money from the customer's other card. The original company extending the card may offer, as a financial incentive, one of several options: paying any service fees charged by the bank or cash wire transfer company; crediting the issued card for some finite amount; reducing the outstanding balance or accepting partial payment as full payment.

Similarly, a delinquent customer who fails to make timely payments in accordance with the terms and conditions issued by a lender may be sent an offer to transfer the balance to another credit card, perhaps with alternative payment terms or a lower annual interest rate. The advantages to such a customer may include a resolution of delinquent balances, avoidance of late fees and lower monthly payments. The original lender may transmit an offer to the customer that includes a financial incentive to transfer an outstanding balance to another card with another lender with a business model more in line with the customer's needs. The offer may inform the customer that an arrangement has been made with a bank or cash wire transfer company for the customer to transfer all or a portion of the customer's outstanding balance to another card with a lower interest rate. To accept the offer, the customer need only contact the bank or cash wire transfer company to complete the transaction. Upon customer contact, the bank or cash wire transfer company then transmits all or a portion of the customer's balance to the original lender, drawing this money from the customer's lower rate, alternate card. The financial incentive may include paying any service fees charged by the bank or cash wire transfer company; crediting the issued card for some finite amount; reducing the outstanding balance or accepting partial payment as full payment.

Turning now to FIG. 1, illustrated therein is one embodiment of an environment 100 suitable for operation of the invention. A lender 101, perhaps who has extended credit through a credit card account to a customer 104, has selected the customer 104 from the lender's pool of customers as a candidate for extension of a balance transfer offer. The balance transfer offer 102 is transmitted to the customer 104. The transmission may be effected through conventional mail and postal delivery, through electronic mail, or through other communications channels including facsimile transmissions.

The balance transfer offer 102, in one embodiment, includes a financial incentive 103 for the customer 104 to accept the offer. The financial incentive 103 may include payment of a service fee, reduction of an outstanding balance owed by the customer 104, waiver of penalties or finance charges accrued by the customer 104, and so forth. The balance transfer offer 102 outlines a proposal for the lender 101 to give the customer 104 the financial incentive 103 in exchange for the customer 104 transferring all, or a portion of, an amount owed to the lender 101 to another company 105. In other words, the lender 101 will provide the financial incentive 103 to the customer 104 if the customer 104 will pay the lender 101 cash for all or a portion of the outstanding balance owed. As many customers do not have cash on hand to pay all or a portion of the outstanding balance, hence there being an outstanding balance due, in one embodiment, funds are drawn from another account in existence with another company 105 to facilitate payment.

In some jurisdictions, regulations are in place prohibiting a direct balance transfer from being completed by a lender. For instance, if a person owes $100 charged to credit card A issued by company A, company A is not allowed to receive payment in the form of a "charge" to credit card B issued by company B. As such, in one embodiment, the financial exchange and balance transfer are effected through a cash wire transfer company 106. As used herein, the term cash wire transfer company is any organization capable of electronically transferring money for a customer. Examples include Western Union, banks and credit unions.

Turning back to FIG. 1, once the balance transfer offer 102 including the financial incentive 103 is transmitted, the customer 104 accepts the offer (the acceptance being shown as 112) by first contacting a cash wire transfer company 106. The customer 104, in one embodiment, provides the cash wire transfer company 106 with an authorization 107 for the cash wire transfer company 106 to charge another account, which is perhaps a credit card with a lower annual percent interest rate, for a sum certain 108. That sum certain 108 is then drawn from the alternate company 105 (shown as 109) by the cash wire transfer company 106. The cash wire transfer company 106 then wires the money (shown as 110) to the original lender 101 as either full or partial payment of the outstanding balance owed by the customer 104. The lender then credits 114 the customer's account 113 accordingly.

As noted above, the financial incentive 103 may take many forms. The lender 101, for example, may accept a partial payment as full payment. Alternatively, the lender 101 may waive penalties and interest. In one embodiment, since the cash wire transfer company 106 charges a service fee to complete the transaction of charging a credit account from a second company 105 and wiring the amount 110 to the lender 101, the financial incentive may include payment of the service fee 111 from the lender 101 on behalf of the customer 104. The customer 104 thus is able, potentially, to lower both the monthly payment and interest payments without any transactional costs. This embodiment of the invention effectively becomes a "cost free refinancing" of a balance due. The customer 104 is happy because the total amount owed has been decreased in real dollars, since less interest will accrue, and the lender 101 is happy because it has received full or partial payment from the customer, thereby reducing total outstanding balances due.

Figure 2:
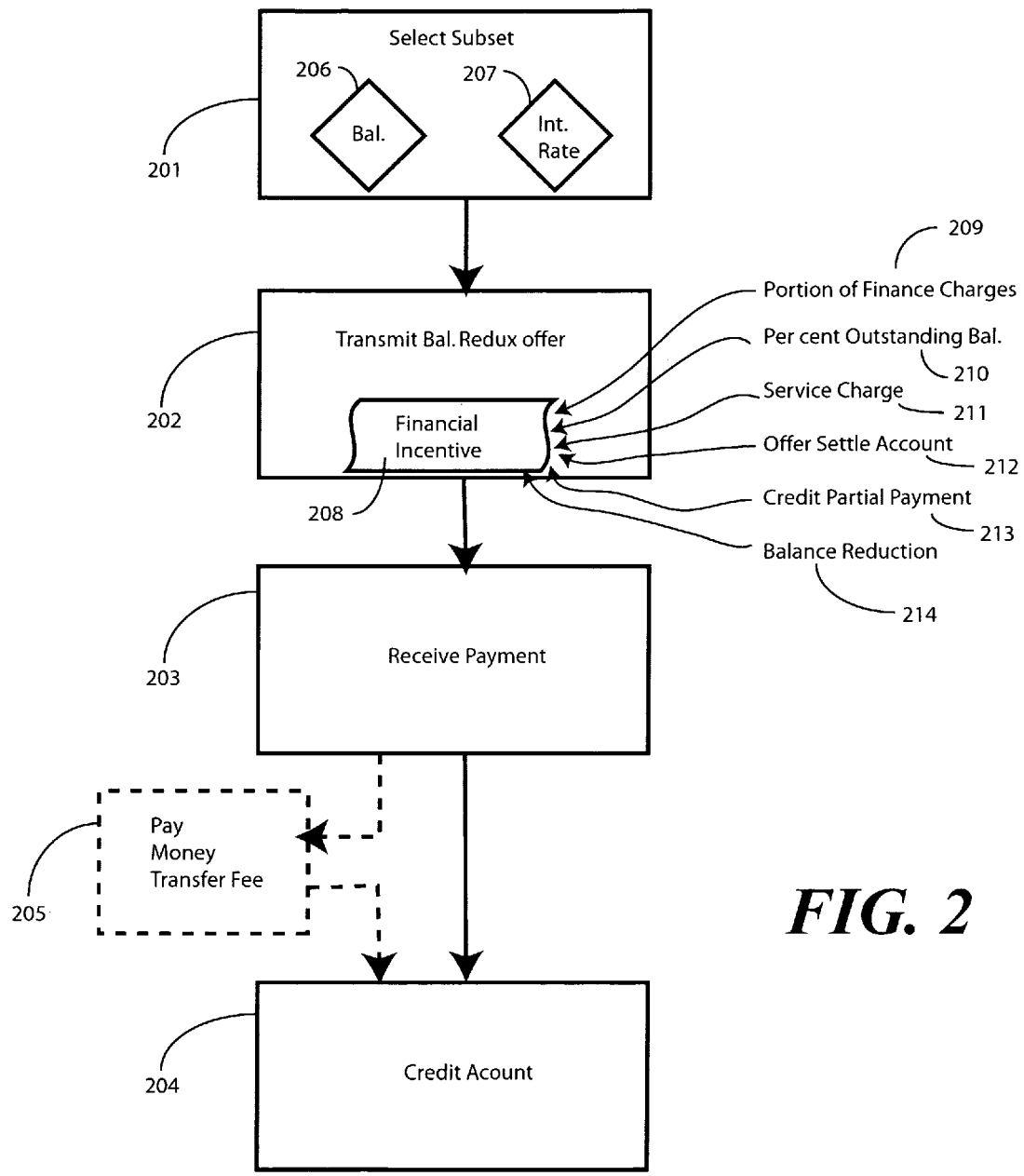
FIG. 2 illustrates a method for reducing a total amount due by a pool of borrowers in accordance with the invention.

Turning now to FIG. 2, illustrated therein is one embodiment of a method for a lender having a pool of borrowers to reduce outstanding borrowed balances in accordance with the invention. At step 201, the lender selects a subset from the pool of borrowers. In one embodiment, the invention may be used to help a lender refine the pool of borrowers such that there is a higher concentration of the vital few, while some of the trivial many are transferred to other companies whose business models are more conducive to their needs. As such, the lender must select a subset of borrowers from the available pool. It is this subset to which balance transfer offers will be sent.

The selection of the subset of borrowers 201 may be done based upon any of a variety of criteria. In one embodiment, the selection of a subset of borrowers from the pool of borrowers is based upon either borrowed balance amount 206 or interest rate 207. Where borrowed balance 206 is selected as the criterion, the lender may select the subset based upon a borrowed balance being in excess of a predetermined threshold, either absolute or in percentage terms. For instance, when a borrower reaches a predetermined absolute threshold, such as $2000, $3000, or $5000, or when a borrower reaches a predetermined percentage threshold, such as 80%, 90% or 95% of available credit limit, the lender may select customers meeting these criteria as being suitable for receipt of a balance transfer offer. It will be clear to those of ordinary skill in the art having the benefit of this disclosure that other criteria may equally be used. For instance, a customer with a predetermined balance who has failed to make one or more payments may qualify to be included in the subset.

Where the criterion is interest rate 207, customers having an interest rate above a predetermined threshold may be selected. As one benefit of the invention to the customer is to transfer a balance to another credit line having a lower annual percentage rate, a predetermined threshold may be selected, above which customers would be included in the subset. This predetermined threshold may be absolute, or may vary, for example so many percentage points above prime. Additionally, in accordance with some terms and conditions associated with various forms of credit, a penalty interest rate is attached to the standard interest rate when a customer fails to make a predetermined number of payments. Thus, the predetermined interest rate threshold may be one of a standard interest rate plus a penalty, or delinquency, interest rate. Customers having interest rates higher than this predetermined threshold may be included in the subset.

At step 202, a balance reduction offer is transmitted from the lender to each borrower of the subset. In accordance with one embodiment of the invention, to encourage the customer to accept the balance reduction offer, the balance reduction offer includes a financial incentive 208 attached thereto. The financial incentive, as noted above, may take many forms. In one embodiment, the financial incentive 208 comprises an offer for an amount of money equal to a portion of outstanding finance charges that have been accrued by the customer 209. In another embodiment, the financial incentive 208 comprises an offer of money equal to a percentage of an outstanding balance owed by the customer 210. In another embodiment, the financial incentive 208 comprises an offer of at least a service charge required to facilitate a fund transfer from a second lender 212. In another embodiment, the financial incentive 208 comprises an offer to settle a borrower's account by accepting partial payment as payment in full 212. For instance, the lender may agree to accept ninety cents on the dollar as payment in full. In another embodiment of the invention, the financial incentive 208 comprises a predetermined amount of principle owed by the customer 213. In yet another embodiment, the financial incentive 208 comprises a balance reduction 214.

Once the balance reduction offer is transmitted at step 202, where the customer accepts, the lender receives at least a partial payment from a borrower of the subset at step 203. This payment may be part or all of the balance due by the customer. As noted with the discussion of FIG. 1, this payment may come through an intermediary, like a cash wire transfer company for example.

Where the financial incentive 208 comprises at least a service charge to facilitate a fund transfer from a second lender, as may be the case when the customer uses a cash wire transfer company to facilitate the transfer, the lender may convey the financial incentive 208 in a number of ways. For instance, if the customer pays the service charge to facilitate the transfer of money, the lender may credit the customer's account for an amount equal to the service charge as a reimbursement. In another embodiment, however, to make the process easier for the customer, the lender may have an arrangement with the cash wire transfer company such that the lender pays the cash wire transfer company directly upon acceptance of the balance reduction offer. In such a scenario, the method would further include the optional step 205 of paying a money transfer service, like a cash wire transfer company, a service fee to facilitate the fund transfer from the second lender.

At step 204, the lender credits the account of the customer accepting the balance reduction offer for the payment. Where the financial incentive 208 includes an offer of money that will be credited to the account, e.g. a percentage of the outstanding balance, a portion of accrued finance charges, a balance reduction, and the like, the lender credits the account of the customer at step 204 for at least the financial incentive. Thus, the credit may be for the payment received plus an additional amount equal to the financial incentive 208.

Figure 3:
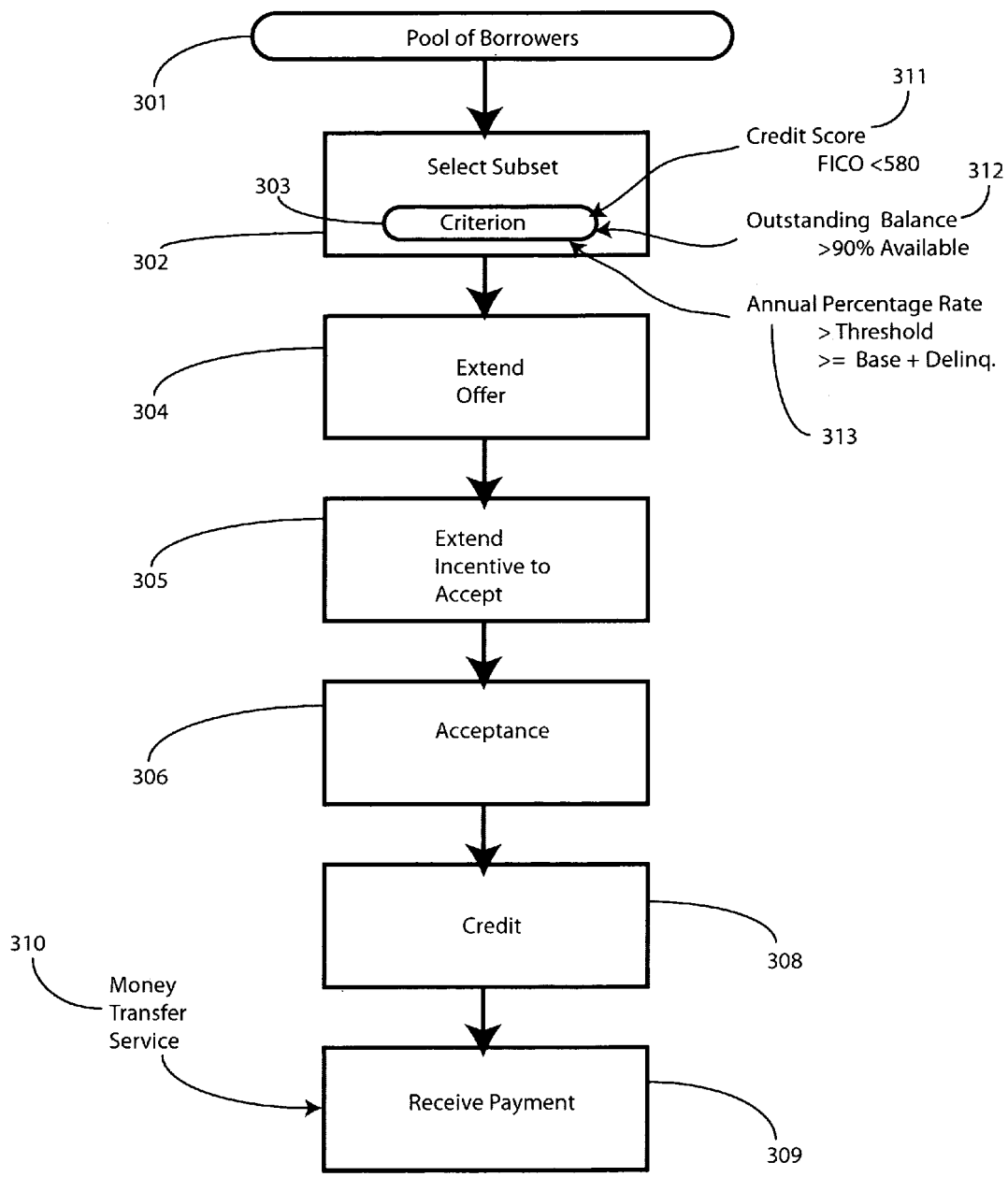
FIG. 3 illustrates a method for reducing a total amount due by a pool of borrowers in accordance with the invention.

Turning now to FIG. 3, illustrated therein is a method for a lender to reduce a total amount due by a pool of borrowers in accordance with the invention. At 301, a pool of borrowers is indicated. If the lender is in the business of providing credit card services, for example, the pool of borrowers may include all customers to whom credit cards have been issued. The pool indicated at 301 need not be so large, however. Continuing with the credit card example, where the lender issues various types of cards, for instance a platinum, gold and silver card, the pool may include only borrowers having one specific type of card.

From this pool of borrowers, a subset of borrowers is selected at step 302. It is this subset to whom a balance reduction offer will be extended. The selection of the subset may be accomplished or be dependent upon one or more criteria 303. For example one criterion that may be used to select the subset is a credit score 311. Where the credit score is below a predetermined threshold, that particular borrower may be included in the subset. By way of example, a popular way of determining the credit worthiness of a borrower is with a Fair Isaac Corporation (FICO) credit score. Where the score is below a threshold, the borrower may be included in the subset. One exemplary threshold is a score of 580. Where the borrower has a FICO score below 580, a lender may elect to extend a balance reduction offer to the borrower.

A second criterion that may be used to select the subset in accordance with the invention is outstanding balance 312. As with the method of FIG. 2, the lender may select the subset based upon a borrowed balance being in excess of a predetermined threshold, either absolute or in percentage terms. When a borrower reaches a predetermined absolute threshold, or when a borrower reaches a predetermined percentage threshold, the lender may select the borrower to be included in the subset.

Another criterion that may be used is annual percentage rate 313, or the annual amount of interest paid in a year. As with the method of FIG. 2, the annual percentage rate may be above a predetermined threshold, or may be where the annual percentage rate is at least a base rate and a delinquency adder rate. The balance reduction offer may notify the customer that the lender has made arrangements with, for instance, a cash wire transfer company to allow the borrower to transfer all or a portion of their outstanding balance to another lower-rate line of credit. One example of a lower-rate line of credit is an alternate card held by the user. The balance reduction offer may also include instructions telling the borrower how to accept the balance reduction offer. The instructions may direct the borrower to a cash wire transfer service, or may direct the borrower to a special link or web page on the Internet. The balance reduction offer may also have an expiration date, beyond which the balance reduction offer will no longer be valid.

Once the subset is selected, a balance reduction offer is extended to the subset of borrowers at step 304. At step 305, the lender extends a financial incentive for the borrower to accept the balance reduction offer. It will often be convenient for the financial incentive to be included with the balance reduction offer, and thus steps 304 and 305 may be combined. However, where the borrower is directed to a web page or third party, the full details of the financial incentive may be given at a later time.

At step 306, the borrower accepts the terms of the balance reduction offer by following the instructions contained within the balance reduction offer. At step 308, the lender credits the account of the of the borrower for an amount equal to the financial incentive. This credit can occur upon receipt of an acceptance of the balance reduction offer, or it may occur when payment is received at step 309. Where, for instance, the borrower accepts by contacting a cash transfer wire service, the cash transfer wire service may notify the lender of acceptance, at which time the lender may either pay the cash wire transfer service for facilitating the transaction, or the lender may credit the account of the borrower for the financial incentive.

Figure 4:
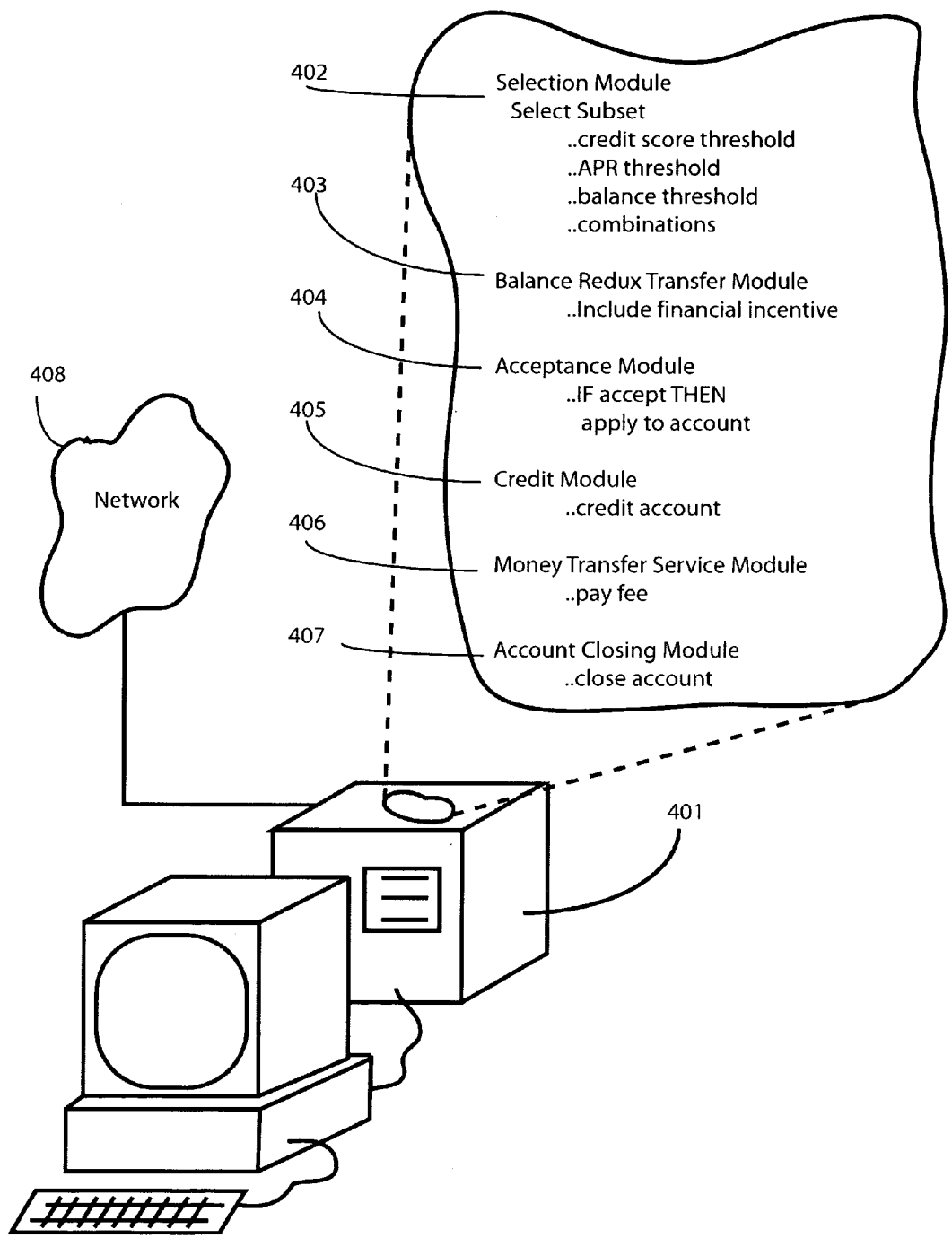
FIG. 4 illustrates a system for effecting a balance transfer offer in accordance with the invention.

As noted above, the methods in accordance with the invention may be performed with paper balance reduction offers and couriered money. However, given recent technological advantages in computers, networks and telecommunication, some lenders will find it efficient and cost effective to automate the process using computers. Turning now to FIG. 4, illustrated therein is such a system for effecting a balance reduction offer.

A central computer 401 coupled to a network 408 is programmed with executable code for accomplishing the steps in accordance with the invention. The computer 401 may be coupled to a network like the Internet or World Wide Web such that the balance reduction offer may be transmitted to the subset of borrowers by e-mail or other forms of electronic communication. The borrowers wishing to accept may then indicate as much by way of a web page or Internet portal.

The computer 401 includes central processing circuitry and associated memory for storing the operational code. The operational code includes various modules 403-407 for effecting balance reduction offer transmission to borrowers in a subset selected from a pool of available borrowers. A selection module 402 is configured to select from a set of borrowers a subset of borrowers. The subset of borrowers is characterized by a selection criterion that may be a credit score below a predetermined credit score threshold, an outstanding balance above a predetermined outstanding balance threshold, an annual interest rate above a predetermine annual interest rate threshold, and combinations thereof.

A balance reduction transfer module 403 is configured to transmit a balance reduction offer to members of the subset of borrowers. In one embodiment, as described above, the balance reduction offer comprises at least one financial incentive intended to encourage the borrower to accept the balance reduction offer.

An acceptance module 404 is configured to receive notice of a borrower's acceptance of the balance reduction offer. Where the acceptance is received, a credit module 405 is configured to apply the financial incentive to accounts of any members of the subset of borrowers who accept the balance reduction offer. The payment received by the lender may be a partial or full payment of an outstanding balance.

A money transfer fee service module 406 is configured to pay a money transfer service, like a cash wire transfer company, a service fee for effecting the payment from a third party lender in response to the balance reduction offer's acceptance by a borrower.

In some situations, a borrower will pay an amount requested in full, thereby leaving a zero balance due. In such situations, an account closing module 407 is configured to close the account of the borrower responding to the balance reduction offer. Such an account closing may be included in the terms of the balance reduction offer transmitted to the borrower.

In the foregoing specification, specific embodiments of the present invention have been described. However, one of ordinary skill in the art appreciates that various modifications and changes can be made without departing from the scope of the present invention as set forth in the claims below. Thus, while embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. For a first lender having a pool of borrowers, a method operable with one or more modules operable with one or more processors to control the one or more processors to implement a reduction of outstanding borrowed balances, the method comprising the steps of:
    a. selecting, by the first lender with a selection module operable with one or more processors, a subset from the pool of borrowers, the selection being based upon at least a criterion selected from the group consisting of borrowed balance amount and interest rate;
    b. transmitting, by the first lender with a transfer module operable with one or more processors, a balance reduction offer to each borrower of the subset, wherein the balance reduction offer comprises a financial incentive to transfer all or a portion of the borrowed balance to a second lender, wherein the first and second lenders are different;
    c. receiving, by the first lender, at least a partial payment from at least one borrower from the subset; and
    d. crediting, by the first lender with a credit module operable with one or more processors, an account of the at least one borrower from the subset.

2. The method of claim 1, further comprising the step of paying a money transfer service provider a service fee to facilitate a fund transfer from the second lender.

3. The method of claim 1, wherein the step of crediting an account of the at least one borrower from the subset comprises crediting the account of the at least one borrower for at least the financial incentive, wherein the financial incentive comprises a portion of outstanding finance charges accrued by a borrower.

4. The method of claim 1, wherein the step of crediting an account of the at least one borrower from the subset comprises crediting the account of the at least one borrower for at least the financial incentive, wherein the financial incentive comprises a percentage of an outstanding balance owed by a borrower.

5. The method of claim 1, wherein the step of crediting an account of the at least one borrower from the subset comprises crediting the account of the at least one borrower for at least the financial incentive, wherein the financial incentive comprises an amount of at least a service charge to facilitate a fund transfer from a second lender.

6. The method of claim 1, wherein the step of crediting an account of the at least one borrower from the subset comprises crediting the account of the at least one borrower for at least the financial incentive, wherein the financial incentive comprises an offer to settle a borrower's account by accepting partial payment as payment in full.

7. The method of claim 1, wherein the step of crediting an account of the at least one borrower from the subset comprises crediting the account of the at least one borrower for at least the financial incentive, wherein the financial incentive comprises a credit for an amount of principal owed.

8. The method of claim 1, wherein the step of crediting an account of the at least one borrower from the subset comprises crediting the account of the at least one borrower for at least the financial incentive, wherein the financial incentive comprises a balance reduction.

9. A method operable with one or more modules operable with one or more processors to control the processors to implement a reduction of a total amount due by a pool of borrowers of a first lender, the method comprising the steps of:
 a. selecting, with a selection module operable with one or more processors, a subset of borrowers from the pool of borrowers of the first lender to whom a balance reduction offer will be extended, the selection of the subset being based on at least one of a credit score, an outstanding balance and an annual percent interest rate;
 b. extending, with a transfer module operable with one or more processors, a balance reduction offer to the subset of borrowers to transfer all or a portion of the total amount due to a second lender, wherein the first and second lenders are different;
 c. extending, with a transfer module operable with one or more processors, a financial incentive to accept the balance reduction offer to the subset of borrowers;
 d. crediting, with a credit module operable with one or more processors, an account of a borrower selected from the subset for an amount equal to the financial incentive upon receipt of an acceptance of the balance reduction offer; and
 e. receiving a payment from the borrower selected from the subset.

10. The method of claim 9, wherein the pool of borrowers comprises a set of individuals to whom credit cards have been issued by the lender.

11. The method of claim 10, wherein the step of selecting comprises choosing borrowers having an annual percentage rate above a predetermined threshold.

12. The method of claim 10, wherein the predetermined threshold comprises a base interest rate plus an additional delinquency interest rate.

13. The method of claim 9, wherein the step of selecting comprises choosing borrowers having an outstanding balance amount exceeding 90% of an available credit limit.

14. The method of claim 9, wherein the step of selecting comprises choosing borrowers having a credit score below a predetermined threshold.

15. The method of claim 14, wherein the credit score comprises a Fair Isaac Corporation score, further wherein the predetermined threshold is less than 580.

16. The method of claim 9, wherein the payment comprises funds received from a money transfer service.

17. The method of claim 9, wherein the financial incentive comprises an amount equal to a predetermined percentage of the outstanding balance.

18. A system for effecting a balance reduction offer to a set of borrowers of a first lender, the system comprising:
 a. a module, operable with one or more processors to control the one or more processors, and configured to select from the set of borrowers a subset of borrowers characterized by at least one of a credit score below a predetermined credit score threshold, an outstanding balance above a predetermined outstanding balance threshold, an annual interest rate above a predetermined annual interest rate threshold, and combinations thereof;
 b. a module, operable with the one or more processors to control the one or more processors, and configured to transmit a balance reduction offer to members of the subset of borrowers, wherein the balance reduction offer comprises an offer to transfer an account balance to a third party lender and at least one financial incentive to accept the balance reduction offer, wherein the third party lender and the first lender are different;
 c. a module, operable with the one or more processors to control the one or more processors, and configured to apply the financial incentive to accounts of any members of the subset of borrowers who accept the balance reduction offer; and
 d. a module, operable with the one or more processors to control the one or more processors, and configured to credit the accounts of any members of the subset of borrowers when the any members of the subset of borrowers transmit a payment.

19. The system of claim 18, wherein the system comprises a module, operable with the one or more processors to control the one or more processors, and configured to pay a money transfer service at least a service fee for effecting a payment from the third party lender in response to the balance reduction offer.

20. The system of claim 18, wherein the payment comprises a payment in full, wherein the system further comprises a module configured to close an account of a borrower responding to the balance reduction offer.

* * * * *